United States Patent

Matsuno et al.

[11] Patent Number: 5,929,158
[45] Date of Patent: Jul. 27, 1999

[54] NON-AQUEOUS POLYMER DISPERSION AND CURABLE COMPOSITIONS

[75] Inventors: Yoshizumi Matsuno, Hadano; Nobushige Numa, Ebina; Chihiro Nagano, Yokohama; Satoshi Ikushima, Amagasaki; Yasumasa Okumura, Yokohama, all of Japan

[73] Assignee: Kansai Paint Company, Limited, Amagasaki, Japan

[21] Appl. No.: 09/072,461

[22] Filed: May 5, 1998

Related U.S. Application Data

[62] Division of application No. 08/991,637, Dec. 16, 1997.

[30] Foreign Application Priority Data

Dec. 18, 1996 [JP] Japan .................................. 8-338357

[51] Int. Cl.$^6$ ...................................................... C08L 27/00
[52] U.S. Cl. ............................................ 524/520; 524/510
[58] Field of Search ............................................... 524/520

[56] References Cited

U.S. PATENT DOCUMENTS 4,792,444  12/1988  Fukasawa .................................. 424/63
5,214,080   5/1993  Iwamura .................................. 524/530

Primary Examiner—Paul R. Michl
Attorney, Agent, or Firm—Armstrong, Westerman, Hattori, McLeland & Naughton

[57] ABSTRACT

The invention provides a non-aqueous polymer dispersion wherein a particulate polymer is dispersed in an organic solvent containing a dispersion stabilizer resin, the polymer being insoluble to the organic solvent and containing a fluoroalkyl group-containing (meth)acrylate as a monomer component. The invention further provides a curable composition comprising the non-aqueous polymer dispersion, a hydroxyl group containing resin and at least one crosslinking agent selected from the group consisting of amino resins, tris(alkoxycarbonylamino)triazines, polyisocyanate compounds and blocked polyisocyanate compounds. A highly stain-resistant coating film can be formed using the dispersion or composition of the invention.

5 Claims, No Drawings

NON-AQUEOUS POLYMER DISPERSION AND CURABLE COMPOSITIONS

This application is a divisional of Ser. No. 08/991,637, filed Dec. 16, 1997.

The present invention relates to a non-aqueous polymer dispersion prepared by dispersing a particulate polymer in an organic solvent containing a dispersion stabilizer resin.

A non-aqueous polymer dispersion and its use for forming a stain-resistant coating film are known, the dispersion being prepared by polymerizing a radical polymerizable monomer in an organic solvent solution containing a fluoroalkyl group-containing (meth)acrylate polymer as a dispersion stabilizer resin, so that the resulting particulate polymer insoluble in the organic solvent is dispersed therein (Japanese Examined Patent Publication No. 67967/1994). However, the coating film formed using this dispersion is insufficient in water repellency and oil repellency and does not always exhibit satisfactory stain resistance. Particularly in the open air, many pollutants adhere to the coating film and are difficult to remove therefrom.

An object of the invention is to provide a non-aqueous polymer dispersion for forming a coating film which is satisfactory in water repellency and oil repellency and highly stain resistant and exhibits excellent water repellency retentivity so that pollutants hardly adhere to the coating film or pollutants are easily removed therefrom. Another object is to provide a curable composition containing this dispersion.

The present invention provides a non-aqueous polymer dispersion (I) wherein a particulate polymer is dispersed in an organic solvent containing a dispersion stabilizer resin, the polymer being insoluble to the organic solvent and containing a fluoroalkyl group-containing (meth)acrylate as a monomer component.

The present invention further provides a curable composition (II) which comprises the above non-aqueous polymer dispersion, a hydroxyl group-containing resin and at least one crosslinking agent selected from the group consisting of amino resins, tris(alkoxycarbonylamino)triazines, polyisocyanate compounds and blocked polyisocyanate compounds.

As a result of intensive research, the present inventors found that the above objects can be achieved with a non-aqueous polymer dispersion of a particulate polymer containing a fluoroalkyl group-containing (meth)acrylate as a monomer component. The present invention has been accomplished based on this finding.

The non-aqueous polymer dispersion (I) and curable composition (II) according to the invention are described below in detail.

The non-aqueous polymer dispersion (I) is a dispersion wherein a particulate polymer (C) is dispersed in an organic solvent (B) containing a dispersion stabilizer resin (A), the polymer being insoluble to the organic solvent and containing a fluoroalkyl group-containing (meth)acrylate as a monomer component.

The dispersion stabilizer resin (A) is used to stably disperse a particulate polymer (C) in an organic solvent (B). Preferred types of dispersion stabilizer resins are soluble in the organic solvent (B) but incompatible with the particulate polymer (C). Examples of such resins are acrylic resins, vinyl resins, polyester resins, alkyd resins, urethane resins, fluorine-containing resins and the like. The resins may optionally have one or more functional groups such as hydroxyl, carboxyl, epoxy, silanol, alkoxysilane, blocked or unblocked isocyanate, etc.

It is further advantageous for the dispersion stabilizer resin (A) to have at least 0.1 polymerizable double bond per molecule on the average. The polymerizable double bond in the dispersion stabilizer resin forms a covalent bond with the particulate polymer (C), thus improving the dispersion storage stability and mechanical stability.

A polymerizable double bond can be introduced into the dispersion stabilizer resin by reacting a functional group in the resin with a polymerizable monomer containing a functional group reactive with the functional group in the resin. For example, a carboxyl group-containing dispersion stabilizer resin is reacted with a glycidyl group-containing polymerizable monomer or a glycidyl group-containing dispersion stabilizer resin is reacted with a carboxyl group-containing polymerizable monomer to introduce a polymerizable double bond into the resin. Useful glycidyl group-containing polymerizable monomers are glycidyl acrylate, glycidyl methacrylate, allylglycidyl ether and the like. Useful carboxyl group-containing polymerizable monomers are acrylic acid, methacrylic acid, maleic acid, fumaric acid, itaconic acid and the like.

The combination of functional groups includes a combination of acid anhydride and hydroxyl groups, acid anhydride and mercaptan groups, isocyanate and hydroxyl groups, etc. as well as the above-mentioned combination of carboxyl and glycidyl groups.

The molecular weight of the dispersion stabilizer resin (A) is not specifically limited. The dispersion stabilizer resin (A) preferably has a weight average molecular weight of about 3,000 to about 150,000, more suitably about 5,000 to about 50,000.

The organic solvent (B) includes those in which the particulate polymer (C) is substantially insoluble but which dissolve the dispersion stabilizer resin (A) and fluoroalkyl group-containing (meth)acrylate and another polymerizable monomer used to produce the particulate polymer (C). The organic solvent for use is suitably selected in view of compositions, molecular weights or other characteristic values of the dispersion stabilizer resin (A) and particulate polymer (C) actually used. Examples of the organic solvent are aliphatic hydrocarbons such as hexane, heptane, octane, cyclohexane, etc.; aromatic hydrocarbons such as benzene, xylene, toluene, etc.; esters such as methyl acetate, ethyl acetate, isobutyl acetate, acyl acetate, ethylene glycol monomethyl ether acetate, 2-ethylhexyl acetate, diethylene glycol monomethyl ether acetate, etc.; ethers such as cellosolve, butyl cellosolve, isopropyl ether, ethylene glycol monomethyl ether, diethylene glycol monobutyl ether, etc.; alcohols such as ethyl alcohol, isopropyl alcohol, n-butyl alcohol, i-butyl alcohol, octyl alcohol, hexyl alcohol, etc.; ketones such as methyl isobutyl ketone, diisobutyl ketone, methyl ethyl ketone, isophorone, acetophenone, ethyl isoamyl ketone, methyl isoamyl ketone, ethyl butyl ketone, etc. Generally these solvents are preferably used as mixed solvents mainly comprising aliphatic hydrocarbon and containing other optional organic solvents such as aromatic hydrocarbons, alcohols, ethers, esters, ketones or the like.

The non-aqueous polymer dispersion (I) is prepared by copolymerizing a fluoroalkyl group-containing (meth)acrylate and another polymerizable monomer in a mixture of dispersion stabilizer resin (A) and organic solvent (B) to form a particulate polymer (C) insoluble to the mixture.

The fluoroalkyl group-containing (meth)acrylate compound (C-1) to be used to prepare a particulate polymer (C) is represented by the formula $$CH_2=C(R)-COO-(CH_2)_n-Rf \tag{1}$$

wherein R is hydrogen or methyl, n is an integer of 1 to 10, Rf is a straight- or branched-chain fluoroalkyl group having 1 to 21 carbon atoms. The "fluoroalkyl group" is formed by substituting some or all of the hydrogen atoms in a straight- or branched-chain $C_{1-21}$ hydrocarbon group with fluorine atoms. Of fluoroalkyl groups, "perfluoroalkyl group" is formed by substituting all of the hydrogen atoms in a straight- or branched-chain $C_{1-21}$ hydrocarbon group with fluorine atoms.

Examples of the fluoroalkyl group-containing (meth) acrylate (C-1) are perfluoromethylmethyl acrylate, perfluoromethylmethyl methacrylate, perfluorobutylethyl acrylate, perfluorobutylethyl methacrylate, perfluoroisononylethyl acrylate, perfluoroisononylethyl methacrylate, perfluorooctylethyl acrylate, perfluorooctylethyl methacrylate, 2,2,3,3-tetrafluoropropyl acrylate, 2,2,3,3-tetrafluoropropyl methacrylate, 1H,1H,5H-octafluoropentyl acrylate, 1H,1H, 5H-octafluoropentyl methacrylate, etc.

Another polymerizable monomer (C-2) to be copolymerized with the fluoroalkyl group-containing (meth)acrylate (C-1) is not limited specifically and any radical polymerizable unsaturated monomer can be used. Typical examples of such monomers are shown below.

(a) Esters of Acrylic Acid or Methacrylic Acid $C_{1-20}$ alkyl esters of acrylic or methacrylic acid such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobornyl acrylate, isobornyl methacrylate, hexyl acrylate, hexyl methacrylate, octyl acrylate, octyl methacrylate, lauryl acrylate, lauryl methacrylate, etc.; $C_{3-20}$ cycloalkyl esters of acrylic or methacrylic acid such as cyclohexyl acrylate, cyclohexyl methacrylate, etc.; $C_{2-8}$ alkenyl esters of acrylic or methacrylic acid such, as allyl acrylate, allyl methacrylate, etc.; and $C_{3-20}$ alkenyloxyalkyl esters of acrylic or methacrylic acid such as allyloxyethyl acrylate, allyloxyethyl methacrylate, etc.

(b) Glycidyl Group-containing Unsaturated Monomers glycidyl acrylate, glycidyl methacrylate, etc.

(c) Hydroxyl Group-containing Unsaturated Monomers $C_{2-8}$ hydroxyalkyl esters of acrylic or methacrylic acid such as hydroxyethyl acrylate, hydroxyethyl methacrylate, hydroxypropyl acrylate, hydroxypropyl methacrylate, etc.; hydroxyalkylvinyl ethers such as hydroxybutylvinyl ether, etc.; and allyl alcohol, methallyl alcohol, etc.

(d) Alkoxysilane Group-containing Unsaturated Monomers

γ-acryloyloxypropyl trimethoxy silane, γ-methacryloyloxypropyl trimethoxy silane, β-acryloyloxyethyl trimethoxy silane, γ-methacryloyloxyethyl trimethoxy silane, γ-acryloyloxypropyl triethoxy silane, γ-methacryloyloxypropyl triethoxy silane, vinyl trimethoxy silane, vinyl triethoxy silane, vinyl tris(2-methoxyethoxy) silane, etc.

(e) Unsaturated Carboxylic Acids acrylic acid, methacrylic acid, itaconic acid, maleic acid, fumaric acid, crotonic acid, etc.

(f) Isocyanate Group-containing Unsaturated Monomers 2-isocyanatoethyl acrylate, 2-isocyanatoethyl methacrylate, m-isopropenyl-α,α-dimethylbenzylisocyanate, etc.

(g) Unsaturated Monomer Containing at Least Two Polymerizable Unsaturated Bonds ethyleneglycol diacrylate, ethyleneglycol dimethacrylate, diethylene glycol diacrylate, diethylene glycol dimethacrylate, trimethylolpropane triacrylate, trimethylolpropane trimethacrylate, etc.

(h) Vinyl Aromatic Compounds styrene, α-methylstyrene, vinyltoluene, p-chlorostyrene, vinylpyridine, etc.

(i) Others acrylonitrile, methacrylonitrile, methyl isopropenyl ketone, vinyl acetate, VeoVa monomer (trade name; product of Shell Chemicals, Co., Ltd.), vinyl propionate, vinyl pivalate, ethylene, propylene, butadiene, N,N-dimethylaminoethyl acrylate, N,N-dimethylaminoethyl methacrylate, acrylamide, vinylpyridine, etc.

The particulate polymer (C) of the non-aqueous polymer dispersion (I) is a copolymer of a fluoroalkyl group-containing (meth)acrylate (C-1) and another polymerizable monomer (C-2) and prepared by polymerizing these monomers. The proportions of the components (C-1) and (C-2) can be selected according to the purpose. Based on the total amount of these two components, the component (C-1) is preferably used in an amount of 90 to 1% by weight, more suitably 30 to 5% by weight and the component (C-2) is preferably used in an amount of 10 to 99% by weight, more suitably 70 to 95% by weight.

The polymerization of the components (C-1) and (C-2) to obtain the particulate polymer (C) is preferably carried out in the presence of a radical polymerization initiator. Usable radical polymerization initiators are azo type initiators such as 2,2'-azobisisobutylonitrile, 2,2'-azobis(2,4-dimethylvaleronitrile), etc. and peroxide type initiators such as benzoyl peroxide, lauryl peroxide, tert-butyl peroxyoctoate, etc. It is suitable that the polymerization initiator be used in an amount of 0.2 to 10 parts by weight, preferably 0.5 to 5 parts by weight, per 100 parts by weight of the monomers (C-1) and (C-2).

A functional group-containing particulate polymer (C) can be obtained using as another polymerizable monomer (C-2) a functional group-containing monomer selected from the above (b) glycidyl group-containing unsaturated monomers, (c) hydroxyl group-containing unsaturated monomers, (d) alkoxysilane group-containing unsaturated monomers, (e) unsaturated carboxylic acids, (f) isocyanate group-containing unsaturated monomers or the like. The functional group-containing particulate polymer (C) and functional group-containing dispersion stabilizer resin (A) react with a specific type of crosslinking agent described later, thus providing a three dimensionally crosslinked cured coating film. Use of (g) an unsaturated monomer having at least two polymerizable unsaturated bonds forms crosslinking within particles of the particulate polymer (C).

The proportions of the dispersion stabilizer resin (A) and particulate polymer (C) can be selected according to the purpose. For example, the component (A) is incorporated in an amount of 3 to 70% by weight, preferably 5 to 60% by weight, and the component (C) in an amount of 97 to 30% by weight, preferably 95 to 40% by weight, based on the total amount of these two components. It is suitable that the total concentration of the dispersion stabilizer resin (A) and the particulate polymer (C) in the organic solvent (B) be 30 to 70% by weight, preferably 40 to 60% by weight, based on the total amount of the components (A), (B) and (C).

The polymerization of components (C-1) and (C-2) is carried out in an organic solvent (B) containing a dispersion stabilizer resin (A) to produce a particulate polymer (C). A suitable temperature for the polymerization reaction is generally in the range of about 60 to 160° C. and the reaction is completed usually in about 1–15 hours.

The non-aqueous polymer dispersion (I) thus obtained is a dispersion of particulate polymer (C) having a particle size of 0.01 to 1.0 μm in an organic solvent (B) and exhibits extremely high dispersion stability. The dispersion (I) is suitable for use as a coating composition, adhesive, filler or the like.

The curable composition (II) of the invention comprises a non-aqueous polymer dispersion (I), a hydroxyl group-containing resin and at least one crosslinking agent selected from the group consisting of amino resins, tris (alkoxycarbonylamino)triazines, polyisocyanate compounds and blocked polyisocyanate compounds.

The hydroxyl group-containing resin herein means a resin containing at least one hydroxyl group in the molecule. Examples are acrylic resins, polyester resins, alkyd resins, urethane resins and the like having one or more hydroxyl groups. The resin preferably has a weight average molecular weight of about 1,000 to about 150,000 and a hydroxyl value of about 20 to about 200 mg KOH/g. The resin more preferably has a weight average molecular weight of about 5,000 to about 60,000. The resin may further contain a carboxyl group. In this case, the resin preferably has an acid value of not higher than 50 mg KOH/g.

The crosslinking agent to be used in the invention is selected from amino resins, tris(alkoxycarbonylamino) triazines, polyisocyanate compounds or blocked polyisocyanate compounds.

Amino resins which can be used in the invention include methylolated amino resins produced by reacting an aldehyde compound and an amino compound such as melamine, urea, benzoguanamine, acetoguanamine, steroguanamine, spiroguanamine, dicyandiamide and the like. Also usable are these methylolated amino resins etherified with a suitable C alcohol. Alcohols useful for the etherification are methyl alcohol, ethyl alcohol, n-propyl alcohol, isopropyl alcohol, n-butyl alcohol, isobutyl alcohol, 2-ethylbutanol, 2-ethylhexanol, etc. Useful aldehyde compounds include formaldehyde, paraformaldehyde, acetaldehyde, benzaldehyde, etc.

Tris(alkoxycarbonylamino)triazine compounds for use in the invention are represented by the formula

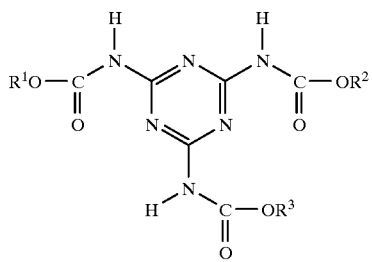

[2]

wherein $R^1$, $R^2$ and $R^3$ are the same or different and independently represent a hydrocarbon group having 1 to 20 carbon atoms.

Examples of hydrocarbon groups represented by $R^1$ to $R^3$ in the formula [2] are alkyl groups such as methyl, ethyl, n-propyl, isopropyl, n-butyl, isobutyl, sec-butyl, tert-butyl, n-pentyl, neopentyl, n-hexyl, n-heptyl, n-octyl, n-nonyl, n-decanyl, n-dodecanyl, n-undecanyl, etc.; cycloalkyl groups such as cyclopentyl, cyclohexyl, etc.; cycloalkyl alkyl groups such as cyclohexyl methyl, cyclohexyl ethyl, etc.; aryl groups such as phenyl, biphenyl, alkyl-substituted phenyl, naphthyl, etc.; aralkyl groups such as benzyl, phenethyl, etc.; and the like.

Tris(alkoxycarbonylamino)triazine compounds of the above formula [2] are known (Japanese Unexamined Patent Publication No. 239038/1993) and some are commercially available. For example, "TACT" (trade name; product of Cytec Industries Incorporation) can be used.

Polyisocyanate compounds that can be used in the invention are organic diisocyanates, for example, aliphatic diisocyanates such as hexamethylene diisocyanate, trimethylhexamethylene diisocyanate, etc.; alicyclic diisocyanates such as hydrogenates xylylene diisocyanate, isophorone diisocyanate, etc.; aromatic diisocyanates such as tolylene diisocyanate, 4,4'-diphenylmethane diisocyanate, etc.; and the like. Useful polyisocyanate compounds include not only the above organic diisocyantes per se but also addition compounds of these organic diisocyanates and a suitable polyvalent alcohol, low-molecular-weight polyester resin, water or the like; cyclic polymers of these organic diisocyanates; isocyanate biurets; and the like.

Blocked polyisocyanate compounds for use in the invention can be produced by blocking isocyanate groups of the above polyisocyante compounds with a blocking agent. Examples of useful blocking agents are phenols, lactams, active methylene compounds, alcohols, mercaptans, acid amides, imides, amines, imidazoles, ureas, carbamic acid esters, imines, oximes, sulfites and the like, among which phenols, lactams, alcohols and oximes are most advantageous.

As regards the crosslinking agent, it is preferable to use at least one crosslinking agent selected from melamine resins, urea resins or tris(alkoxycarbonylamino)triazines.

The proportions of the components in the curable composition (II) can be selected according to the purpose. For example, the proportions of the hydroxyl group-containing resin and crosslinking agent based on the total amount of these two components are such that the former is 50 to 90% by weight, more suitably 60 to 85% by weight, and the latter is 50 to 10% by weight, more suitably 40 to 15% by weight. The non-aqueous polymer dispersion (I) is incorporated in an amount of 0.5 to 40 parts by weight, calculated as solids, more suitably 2 to 25 parts by weight, per 100 parts by weight of the total amount of the hydroxyl group-containing resin and crosslinking agent.

When required, additives can be incorporated into the non-aqueous polymer dispersion (I) or curable composition (II) of the invention. For example, coloring pigments, metallic pigments, iridescent pigments, extender pigments, plasticizers, painted surface modifiers, ultraviolet absorbers, curing catalysts, etc. can be used.

The curable composition (II) of the invention is suitably used as a top coating composition to form a topcoat on automotive exterior panels coated with a primer coat or with a primer coat and an intercoat. For example, in the methods comprising forming a colored base coat and a clear topcoat by 2-coat 1-bake system or 2-coat 2-bake system, the curable composition (II) can be used as a clear topcoat. In the methods comprising forming a colored base coat, a first clear coat and a second clear coat by 3-coat 1-bake system, 3-coat 2-bake system or 3-coat 3-bake system, the curable composition (II) can be used as a second clear coat. Useful colored base coat compositions are solid color coating compositions, metallic coating compositions, pearl-colored coating compositions, etc.

The present invention is described below in more detail with reference to Preparation Examples, Examples and Comparative Examples wherein parts and percentages are all by weight.

PREPARATION EXAMPLE 1

Preparation of Dispersion Stabilizer Resin (A-1)

A mixture was prepared by mixing 10 parts of styrene, 50 parts of isobutyl methacrylate, 9 parts of butyl acrylate, 10 parts of cyclohexyl methacrylate, 10 parts of 2-ethylhexyl methacrylate, 1 part of methacrylic acid, 10 parts of 2-hydroxyethyl methacrylate and 2 parts of 2,2'-azobisisobutyronitrile. The mixture was added dropwise to a mixed solvent of 40 parts of isobutyl acetate and 40 parts of toluene at the reflux temperature over a period of 3 hours. The resulting mixture was aged at the same temperature for 2 hours to give a hydroxyl group-containing acrylic resin (A-1). The resin obtained had a solids content of 55%, a viscosity of N (Gardner viscosity, 25° C.) and a weight average molecular weight of 16,000.

PREPARATION EXAMPLE 2

Preparation of Dispersion Stabilizer Resin (A-2)

A mixture was prepared by mixing 10 parts of styrene, 30 parts of isobutyl methacrylate, 15 parts of 2-perfluorooctylethyl methacrylate, 5 parts of butyl acrylate, 10 parts of cyclohexyl methacrylate, 14 parts of 2-ethylhexyl methacrylate, 1 part of methacrylic acid, 15 parts of 2-hydroxyethyl methacrylate and 6 parts of t-butyl peroxy-2-ethylhexanoate. The mixtures was added dropwise to a mixed solvent of 30 parts of isobutyl acetate and 50 parts of toluene at the reflux temperature over a period of 3 hours. The resulting mixture was aged at the same temperature for 2 hours to give a perfluoro group-containing acrylic polyol resin (A-2). The resin had a solids content of 55%, a viscosity of G (Gardner viscosity, 25° C.) and a weight average molecular weight of 6,000.

PREPARATION EXAMPLE 3

Preparation of Dispersion Stabilizer Resin (A-3)

A mixture was prepared by mixing 10 parts of styrene, 20 parts of butyl methacrylate, 34 parts of isobutyl methacrylate, 5 parts of butyl acrylate, 15 parts of 2-ethylhexyl methacrylate, 1 part of methacrylic acid, 15 parts of 2-hydroxyethyl methacrylate and 2 parts of 2,2'-azobisisobutyronitrile. The mixture was added dropwise to a mixed solvent of 30 parts of isobutyl acetate and 50 parts of toluene at the reflux temperature over a period of 3 hours. The resulting mixture was aged at the same temperature for 2 hours. 0.8 part of glycidyl methacrylate, 0.02 part of 4-tert-butyl pyrocatechol and 0.1 part of dimethyl ethanol amine were added thereto and the mixture was reacted to introduce a polymerizable double bond. A double bond- and hydroxyl group-containing acrylic resin (A-3) was thereby obtained. The resin had a solids content of 55%, a viscosity of L (Gardner viscosity, 25° C.) and a weight average molecular weight of 16,000 and contained about 0.6 polymerizable double bond per molecule on the average.

Example 1

Heating a mixture of 95 parts of heptane and 121 parts of dispersion stabilizer resin (A-1) at the reflux temperature, a mixture of 10 parts of perfluorooctylethyl methacrylate, 10 parts of styrene, 25 parts of methyl methacrylate, 30 parts of acrylonitrile, 25 parts of 2-hydroxyethyl methacrylate and 1.5 parts of 2,2'-azobisisobutyronitrile was added dropwise over a period of 3 hours. The resulting mixture was aged at the same temperature for 2 hours to give a non-aqueous polymer dispersion. The dispersion obtained had a solids content of 53% and a viscosity of C (Gardner viscosity, 25° C.) and was milky white. The particle size of the particulate polymer was 0.2 to 0.3 µm (measured through an electron microscope).

The weight proportion (%) of the particulate polymer to the stabilizer resin in the dispersion was 60/40. Only the particulate polymer contained perfluoroalkyl groups. The dispersion was allowed to stand at room temperature for 3 months. No precipitates or coarse particles were observed.

Example 2

Heating a mixture of 93 parts of heptane and 98 parts of dispersion stabilizer resin (A-2) at the reflux temperature, a mixture of 5 parts of perfluorooctylethyl methacrylate, 15 parts of styrene, 28 parts of methyl methacrylate, 34 parts of acrylonitrile, 18 parts of 2-hydroxyethyl methacrylate and 2 parts of 2,2'-azobisisobutyronitrile was added dropwise over a period of 3 hours. The resulting mixture was aged at the same temperature for 2 hours to give a non-aqueous polymer dispersion. The dispersion obtained had a solids content of 53% and a viscosity of A (Gardner viscosity, 25° C.) and was milky white. The particle size of the particulate polymer was 0.2 to 0.3 µm (measured through an electron microscope).

The weight proportion (%) of the particulate polymer to the stabilizer resin in the dispersion was 65/35. Both of the stabilizer resin and the particulate polymer contained perfluoroalkyl groups. The dispersion was allowed to stand at room temperature for 3 months. No precipitates or coarse particles were observed.

Example 3

Heating a mixture of 90 parts of heptane and 121 parts of dispersion stabilizer resin (A-3) at the reflux temperature, a mixture of 25 parts of perfluoromethylmethyl methacrylate, 10 parts of styrene, 15 parts of methyl methacrylate, 25 parts of acrylonitrile, 25 parts of 2-hydroxyethyl methacrylate and 2 parts of t-butyl peroxy-2-ethylhexanoate was added dropwise over a period of 3 hours. The resulting mixture was aged at the same temperature for 2 hours to give a non-aqueous polymer dispersion. The dispersion obtained had a solids content of 53% and a viscosity of C (Gardner viscosity, 25° C.) and was milky white. The particle size of the particulate polymer was 0.18 to 0.25 µm (measured through an electron microscope).

The weight proportion (%) of the particulate polymer to the stabilizer resin in the dispersion was 60/40. The stabilizer resin had a double bond and only the particulate polymer had perfluoroalkyl groups. The dispersion was allowed to stand at room temperature for 3 months. No precipitates or coarse particles were observed.

Example 4

Heating a mixture of 93 parts of heptane and 149 parts of dispersion stabilizer resin (A-3) at the reflux temperature, a mixture of 10 parts of perfluorooctylethyl methacrylate, 10 parts of styrene, 27 parts of methyl methacrylate, 30 parts of acrylonitrile, 15 parts of 2-hydroxyethyl methacrylate, 5 parts of glycidyl methacrylate, 3 parts of acrylic acid and 2 parts of 2,2'-azobisisobutyronitrile was added dropwise over a period of 3 hours. The resulting mixture was aged at the same temperature for 2 hours to give a non-aqueous polymer dispersion. The dispersion obtained had a solids content of 53% and a viscosity of C (Gardner viscosity, 25° C.) and was milky white. The particle size of the particulate polymer was 0.15 to 0.2 µm (measured through an electron microscope).

The weight proportion (%) of the particulate polymer to the stabilizer resin in the dispersion was 55/45. The stabilizer resin had a double bond and only the particulate polymer contained perfluoroalkyl groups and also had crosslinking within the particle. The dispersion was allowed to stand at room temperature for 3 months. No precipitates or coarse particles were observed.

Comparative Example 1

Heating a mixture of 95 parts of heptane and 121 parts of dispersion stabilizer resin (A-2) at the reflux temperature, a mixture of 15 parts of styrene, 25 parts of methyl methacrylate, 35 parts of acrylonitrile, 25 parts of 2-hydroxyethyl methacrylate and 1.5 parts of 2,2'-azobisisobutyronitrile was added dropwise over a period of 3 hours. The resulting mixture was aged at the same temperature for 2 hours to give a non-aqueous polymer dispersion. The dispersion had a solids content of 53% and a viscosity of A (Gardner viscosity, 25° C.) and was milky white. The particle size of the particulate polymer was 0.2 to 0.3 µm (measured through an electron microscope).

The weight proportion (%) of the particulate polymer to the stabilizer resin in the dispersion was 60/40. Only the stabilizer resin contained perfluoroalkyl groups. The total fluorine content of the dispersion was the same as in Example 1. The dispersion was allowed to stand at room temperature for 3 months. No precipitates or coarse particles were observed.

Comparative Example 2

Heating a mixture of 110 parts of heptane and 108 parts of the dispersion stabilizer resin "Lumiflone LF 200" (trade name; product of Asahi Glass Co., Ltd.; 60% organic solvent solution of a fluoroolefin resin prepared by copolymerizing chlorotrifluoroethylene and alkyl vinyl ether) at the reflux temperature, a mixture of 15 parts of styrene, 30 parts of methyl methacrylate, 35 parts of acrylonitrile, 20 parts of 2-hydroxyethyl methacrylate and 2 parts of 2,2'-azobisisobutyronitrile was added dropwise over a period of 3 hours. The resulting mixture was aged at the same temperature for 2 hours to give a non-aqueous polymer dispersion. The dispersion obtained had a solids content of 52% and a viscosity of B (Gardner viscosity, 25° C.) and was milky white. The particle size of the particulate polymer was 0.15 to 0.2 μm (measured through an electron microscope).

The weight proportion (%) of the particulate polymer to the stabilizer resin in the dispersion was 60/40. Only the stabilizer resin contained fluoroalkyl groups. The dispersion was allowed to stand at room temperature for 3 months. No precipitates or coarse particles were observed.

Comparative Example 3

Heating a mixture of 95 parts of heptane and 121 parts of dispersion stabilizer resin (A-1) at the reflux temperature, a mixture of 10 parts of styrene, 40 parts of methyl methacrylate, 30 parts of acrylonitrile, 20 parts of 2-hydroxyethyl methacrylate and 2 parts of t-butyl peroxy-2-ethylhexanoate was added dropwise over a period of 3 hours. The resulting mixture was aged at the same temperature for 2 hours to give a non-aqueous polymer dispersion. The dispersion obtained had a solids content of 53% and a viscosity of C (Gardner viscosity, 25° C.) and was milky white. The particle size of the particulate polymer was 0.2 to 0.3 μm (measured through an electron microscope).

The weight proportion (%) of the particulate polymer to the stabilizer resin in the dispersion was 60/40. Neither the stabilizer resin nor the particulate polymer contained a fluoroalkyl group.

Next, using the non-aqueous polymer dispersions obtained in Examples 1–4 and Comparative Examples 1–3, coating compositions were prepared by adding thereto the polyisocyanate compound "Coronate EH" (trade name; product of Nippon Polyurethane Industry Co., Ltd.) until the hydroxyl/isocyanate ratio became 1.0 (in terms of equivalent). The compositions were applied to glass plates to form a coating film having a thickness, as cured, of 20 μm. For curing, the coatings were allowed to stand at room temperature for 3 days.

The coatings were tested for properties.

The water repellency and oil repellency of the coatings were determined by measuring (i) water contact angle, (ii) paraffin contact angle and (iii) underwater paraffin contact angle. With respect to the water contact angle, 0.03 cc of water was dropped on the coating surface and the contact angle of the water drop to the coating surface was measured. As regards the paraffin contact angle, 0.03 cc of molten paraffin was dropped on the coating surface and the contact angle of the paraffin drop to the coating surface was measured.

As for the underwater paraffin contact angle, the coated plate was immersed in water with the coated side down and a drop of paraffin (0.03 cc) was placed on the coating surface underwater and the contact angle of the paraffin drop to the coating surface was measured. The numerical value of the underwater paraffin contact angle indicates easiness of removal of urban-type lipophilic dirts (for example, soot and carbon in exhaust gas) by water washing or rain water. The greater the value of the underwater paraffin contact angle, the more easily dirts can be removed by water washing or rain water. The contact angles were all measured with the contact angle meter "CA-X150" (trade name; product of Kyowa Kaimen Kagaku Co., Ltd.).

The coatings were tested for stain removability as follows.

Stain removability: A mixture of 0.25 part of carbon black (12 kinds of dusts for tests, product of Japan Powder Industrial Technology Association) and 99.75 parts of deionized water was adjusted to pH 3.0 with sulfuric acid to obtain a test composition. The above coated plates were sprayed with this test composition, allowed to stand at 20° C. and at a humidity of 70% for 17 hours and heated in a hot air dryer at 80° C. for 6 hours. After repeating this cycle four times, the coating surface was washed with water and a sponge and visually evaluated according to the following criteria.

A: No stains

B: Slightly stained

C: Markedly stained

Table 1 shows the results.

TABLE 1

|  | Example | | | | Comparative Example | | |
| --- | --- | --- | --- | --- | --- | --- | --- |
|  | 1 | 2 | 3 | 4 | 1 | 2 | 3 |
| Water contact angle (°) | 110 | 115 | 108 | 110 | 106 | 88 | 85 |
| Paraffin contact angle (°) | 75 | 80 | 73 | 75 | 58 | 40 | 35 |
| Underwater paraffin contact angle (°) | 95 | 98 | 95 | 93 | 62 | 68 | 75 |
| Stain removability | A | A | A | A | B | B | B |

Example 5

A curable composition was prepared by mixing 70 parts of a hydroxyl group-containing acrylic resin (with a hydroxyl value of 80 mg KOH/g, an acid value of 5 mg KOH/g and a weight average molecular weight: of 25,000); 25 parts of methyl.butyl-etherified melamine resin; and 5 parts of the non-aqueous polymer dispersion obtained in Example 1. The above amounts are calculated as solids.

Example 6

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl.butyl-etherified melamine resin; and 5 parts of the non-aqueous polymer dispersion obtained in Example 2. The amounts are on solid basis.

Example 7

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl.butyl-etherified melamine resin; and 5 parts of the non-aqueous polymer dispersion obtained in Example 3. The amounts are on solid basis.

Example 8

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl.butyl-etherified melamine resin; and 5 parts of the non-aqueous polymer dispersion obtained in Example 4. The amounts are on solid basis.

Example 9

A curable composition was prepared by mixing 80 parts of a hydroxyl group-containing acrylic resin (with a hydroxyl value of 80 mg KOH/g, an acid value of 5 mg KOH/g and a weight average molecular weight of 25,000); 20 parts of tris(methoxy.buthoxycarbonylamino)triazine; 0.5 parts of dodecylbenzenesulfonic acid as a curing catalyst; and 5 parts of the non-aqueous polymer dispersion obtained in Example 1. The amounts are on solid basis.

Comparative Example 4

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl.butyl-etherified melamine resin, and 5 parts of the non-aqueous polymer dispersion obtained in Comparative Example 1. The amounts are on solid basis.

Comparative Example 5

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl.butyl-etherified melamine resin; and 5 parts of the non-aqueous polymer dispersion obtained in Comparative Example 2. The amounts are on solid basis.

Comparative Example 6

A curable composition was prepared by mixing 70 parts of a hydroxyl group-containing acrylic resin (with a hydroxyl value of 80 mg KOH/g, an acid value of 5 mg KOH/g and a weight average molecular weight of 25,000); 25 parts of methyl-butyl-etherified melamine resin; and 5 parts of the non-aqueous polymer dispersion obtained in Comparative Example 3. The amounts are on solid basis.

Next, the compositions obtained in Examples 5 to 8 and Comparative Examples 4 to 6 were applied to glass plates to form a coating film having a thickness, as cured, of 20 µm. For curing, the coatings were heated at 140° C. for 30 minutes. The coatings were tested for stain removability, initial water repellency and water repellency retentivity in the following manner.

Stain removability: in the same manner as above.

Initial water repellency:

The coatings were heated at 140° C. for 30 minutes for curing and allowed to stand at room temperature for 1 hour. Water (0.03 cc) was dropped on the coating surface and the contact angle of the water drop to the coating surface was measured using the contact angle meter "CA-X150" (trade name; product of Kyowa Kaimen Kagaku Co., Ltd.).

Water repellency retentivity:

After the cured coatings were exposed using a sunshine Weather-0-meter for 500 hours, the water contact angle to the coating surface was determined in the same manner as above.

Table 2 shows the results.

TABLE 2

|  | Example | | | | | Comparative Example | | |
| --- | --- | --- | --- | --- | --- | --- | --- | --- |
|  | 5 | 6 | 7 | 8 | 9 | 4 | 5 | 6 |
| Stain removability | A | A | A | A | A | B | B | B |
| Initial water repellency (°) | 110 | 112 | 105 | 108 | 109 | 105 | 86 | 85 |
| Water repellency retentivity (°) | 100 | 100 | 98 | 99 | 101 | 82 | 70 | 67 |

The cured coatings of non-aqueous polymer dispersions of the invention are highly stain resistant and exhibit excellent water repellency retentivity so that pollutants hardly adhere to the coatings or pollutants are easily removed therefrom. The coatings of the invention exhibit much higher stain resistance than those of non-aqueous polymer dispersions containing a fluoroalkyl group-containing (meth)acrylate polymer as a dispersion stabilizer.

What is claimed is:

1. A curable composition which comprises a non-aqueous polymer dispersion comprising a particulate polymer dispersed in an organic solvent containing a dispersion stabilizer resin, the polymer being insoluble to the organic solvent and containing a fluoroalkyl group-containing (meth)acrylate as a monomer component; a hydroxyl group-containing resin and at least one crosslinking agent selected from the group consisting of amino resins, tris (alkoxycarbonylamino)triazines, polyisocyanate compounds and blocked polyisocyanate compounds.

2. A composition according to claim 1 wherein the hydroxyl group-containing resin has a weight average molecular weight of about 1,000 to about 150,000.

3. A composition according to claim 1 wherein the hydroxyl group-containing resin has a hydroxyl value of about 20 to about 200 mg KOH/g.

4. A composition according to claim 1 wherein the crosslinking agent is at least one crosslinking agent selected from the group consisting of melamine resins, urea resins and tris(alkoxycarbonylamino)triazines.

5. A composition according to claim 1 wherein the proportions of the hydroxyl group-containing resin and crosslinking agent based on the total amount of these two components are that the former is 50 to 90% by weight and the latter is 50 to 10% by weight, and the proportion of the non-aqueous polymer dispersion is 0.5 to 40 parts by weight, calculated as solids, per 100 parts by weight of the total amount of the hydroxyl group-containing resin and crosslinking agent.

* * * * *